United States Patent Office 3,787,463

Patented Jan. 22, 1974

3,787,463

AMINE GOLD COMPLEX USEFUL FOR THE ELECTRODEPOSITION OF GOLD AND ITS ALLOYS

Franco Zuntini, Giuseppe Aliprandini, Jean-Michel Gioria, Andre Meyer, and Salvatore Losi, Geneva, Switzerland, assignors to Oxy Metal Finishing Corporation, Warren, Mich.

No Drawing. Continuation-in-part of application Ser. No. 61,868, Aug. 6, 1970. This application Feb. 24, 1972, Ser. No. 229,165

Int. Cl. C07f 1/12

U.S. Cl. 260—430 9 Claims

ABSTRACT OF THE DISCLOSURE

Disclosed is a gold amine complex useful for the electrodeposition of gold and its alloys. The complex has the formula:

$$Me[AAu(SO_3)_2]_pX_q$$

wherein Me is a mono- or polyvalent cation, A is a polyamine having the formula

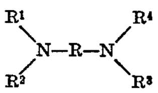

wherein $R^1$, $R^2$, $R^3$ and $R^4$ are individually H or $C_1$ to $C_4$ linear or branched monovalent radicals substituted or not with —OH, —CO or —COOH; or $R^1$ and $R^4$ taken together, or $R^2$ and $R^3$ taken together are divalent $C_2$ to $C_6$ alkylene or alkenylene radicals substituted or not with —OH, —CO or —COOH; R is a $C_2$ to $C_6$ alkylene or alkenylene radical substituted or not with —OH, —CO, —COOH, or is part of an aromatic ring, or is a radical of the formula $$—(CH_2—CH_2—NR^5)_mCH_2CH_2—$$

wherein $m$ is the integer 1, 2 or 3, and $R^5$ is H or a $C_1$ to $C_4$ linear or branched monovalent radical substituted or not with —OH, —CO or —COOH, X is an anion; $p$ is 1, 2, or 3; and $q$ is 0, 1, or 2, the sum of $p+q$ being equal to the valence of Me.

This application is a continuation-in-part of U.S. application, Ser. No. 61,868, filed Aug. 6, 1970.

The present invention concerns new gold mineral-organic compounds, a method for the synthesis thereof and the use of said compounds for the preparation of solutions for the electrolytic deposition of gold and its alloys, especially solutions which are stable at pH of 8 and below.

Heretofore several methods have been used for the electrodeposition of gold or gold alloys from aqueous solutions which are cyanide-free. See, for example, U.S. Pat. No. 3,057,789 and British Pat. No. 1,134,615. Current methods employ alkaline gold sulfite in lieu of potassium gold cyanide. In some instances an excess of sulfite salt is employed. However, current plating solutions making use of alkaline gold sulfite are unstable at a pH lower than 9. This instability lowers the range of usage of the plating baths and prevents, for example, the plating of gold alloys in an acid medium which is so essential for much of the plating on printed circuit boards and other electronic conductors used by the electronics industry.

The present complex compounds have the formula:

$$Me[AAu(SO_3)_2]_pX_q \quad (I)$$

comprising a cationic part, Me, and an anionic part, $[AAu(SO_3)_2]$ wherein A is ammonia or a polyamine having the formula:

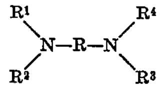

(II)

in which $R^1$, $R^2$, $R^3$, and $R^4$ represent hydrogen or $C_1$ to $C_4$ linear or branched monovalent radicals, substituted or not by an oxygen containing group, e.g. —OH, —CO or —COOH, or $R^1$ and $R^4$ and/or $R^2$ and $R^3$, taken together, represent divalent radicals similar to R, where R represents a $C_2$ to $C_6$ alkylene or alkylene radical substituted or not by an oxygen containing group, e.g. —OH, —CO, —COOH, or is part of an aromatic ring, or R represents a radical of formula $$—(CH_2—CH_2—NR^5)_m—CH_2—CH_2—,$$

$m$ being 1, 2 or 3 and $R^5$ being the same as $R^4$ above.

Me represents a monovalent cationic species e.g. an alkali metal cation such as $Na^+$,$K^+$,$Li^+$ or an ammonium group such as $H_4N^+$ or that derived from one of the N atoms of the amine (II), or Me represents a polyvalent cation, e.g. metal ions such as for instance $Fe^{+2}$, $Fe^{+3}$, $Zn^{+2}$, $Cr^{+3}$, $Co^{+2}$, $Ni^{+2}$, $Cd^{+2}$, the number of ligands of such ions exceeding 1 being associated with a corresponding number of anions such as for instance the anionic part of Formula I, or X, e.g. sulphate, or complex anions, or halide, preferably chloride; $p$ is 1, 2, or 3 and $q$ is 0, 1, or 2, the sum of $p+q$ being equal to the valance of Me.

Examples of such amine (II) are: peperazine, triethylene diamine, o-phenylenediamine, 1,4-diaminocyclohexane, ethylene diamine (en), diethylene triamine (den), bis-(2-hydroxyethyl) - 1,4 - piperazine, ethylene diamine tetraacetic acid (Na salt) and other polyamines such as for instance some of those appearing in "Modern Coordination Chemistry": J. Lewis and R. G. Wilkins, Intersc. Publ., New York (1960), see list of abbreviations, page xiii. Said abbreviations are being used herethrough for simplicity when necessary.

The method for preparing compounds (I) comprises adding polyamine A (II) into a solution, preferably aqueous, of a gold$^{III}$ salt, e.g. gold chloride and thereafter adding to the above mixture an $SO_3^{-2}$ containing or producing material, e.g. a sulphite or $SO_2$, then filtering and purifying, by usual methods, the salt which crystallizes or precipitates from the mixture.

It is preferable, for better yields, to mix the ingredients in the order given above.

The medium for carrying out the above method can be water or at least one organic solvent, preferably aqueous. Such solvents can be, alcohols, e.g. MeOH, EtOH, isoPropOH, ketones, e.g. acetone and ethers e.g. dioxane or THF. The choice of the solvent will be dictated by the respective solubilities of the starting materials and the resulting complex.

The operating temperature will be comprised between approximately 0 and 100° C., preferably between 20 and 80° C. Although these limits are not generally critical, it should be noted that the solubility of the starting ingredients may be too low at the lower temperatures of the above range whereas too high a temperature may be detrimental to the yield of complex (I).

The sulphites which can be used in this process can be metal sulphites, e.g. Na, K or Li sulphites, ammonium and amine sulphites, e.g. $(NH_4)_2SO_3$, en $SO_3$, $$(Me_3N)_2SO_3$$

and alkyl or glycol sulphites, e.g. ethyl or ethylene sulphites.

It should also be noted that, although compounds I are fairly stable under normal conditions, they should preferably be treated, during purification, at a pH not lower than 7 since a pH below 7 might promote decomposition.

In the above process, for optimum yields, it is preferable to use the reagents in slight excess over stoichiometry with regard to the amount of gold.

The following examples illustrate the above process.

EXAMPLE 1

Preparation of $Na[H_2N—CH_2—CH_2—NH_2Au(SO_3)_2]$

To a molar solution of $gold^{III}$ chloride in water were added 5 mole equivalents of ethylene diamine 25% by weight in $H_2O$. Heat was evolved which was removed by cooling. The temperature was lowered to room temperature, then a saturated water solution containing 2.2 equivalents of sodium sulphite was slowly added with stirring and cooling. The complex which precipitated was filtered, washed with water at pH 8–9 and dried under reduced pressure. The yield was over 90%.

*Analysis.*—Calcd. for $C_2H_6N_2O_6S_2AuNa$ (percent): C, 5.45; H, 1.83; N, 6.36; S, 14.57. Found (percent): C, 5.93; H, 2.03; N, 5.99; S, 14.03.

EXAMPLE 2

Preparation of $H_4N[H_2N—CH_2—CH_2—NH_2Au(SO_3)_2]$

The method of Example 1 was repeated with the same molar quantities of $gold^{III}$ chloride and ethylene diamine. Thereafter, 2.4 equivalents of ammonium sulphite in the form of concentrated aqueous solution were added to the mixture as described in Example 1 and the resulting product was collected and purified as usual.

*Analysis.*—Calcd. for $C_2H_{12}N_3O_6S_2Au$ (percent): C, 5.52; H, 2.78; N, 9.66; S, 14.73. Found (percent): C, 5.63; H, 2.88; N, 9.25; S, 13.75.

EXAMPLE 3

Preparation of $H_3N—CH_2—CH_2—NH_3[H_2N—CH_2—CH_2—NH_2Au(SO_3)_2]_2$

To an aqueous 0.5 molar solution of $gold^{III}$ chloride were added with cooling 9 molar equivalents of ethylene diamine as a 25% by weight water solution. Then, with vigorous stirring and cooling were added 4.6 equivalents of ethylene sulphite. The pale yellow crystals which separated were collected and purified as usual. Yield over 80%.

*Analysis.*—Calcd. for $C_6H_{26}N_6O_{12}S_4Au_2$ (percent): C, 8.04; H, 2.92; N, 9.37; S, 14.31. Found (percent): C, 8.58; H, 3.00; N, 9.70; S, 14.30.

EXAMPLE 4

Preparation of $H_3N—CH_2—CH_2—NH_3[H_2N—CH_2—CH_2—NH_2Au(SO_3)_2]_2$

As described in Example 3, a mixture was prepared from a 0.4 molar solution of $gold^{III}$ chloride 7.5 equivalents of ethylene diamine. To this was added, at room temperature, a slow current of $SO_2$, while stirring vigorously. A precipitate started to separate and, when the pH of the mixture was about 6.5–7.0, the introduction of $SO_2$ was stopped. The colorless crystals were collected and purified as usual.

*Analysis.*—Calcd. for $C_6H_{26}N_6O_{12}S_4Au_2$ (percent): C, 8.04; H, 2.92; N, 9.37. Found (percent): C, 8.39; H, 3.39; N, 8.99.

EXAMPLE 5

The method of Example 2 was followed with the only difference that $(H_4N)_2SO_3$ was replaced by $K_2SO_3$. The product was collected as usual.

*Analysis.*—Calcd. for $C_2H_8N_2O_6S_2AuK$ (percent): N, 6.14; S, 14.07. Found (percent): N, 5.91; S, 13.55.

According to the invention, the method for preparing solutions for the electrodeposition of gold and gold alloys by means of the present complex comprises reducing said compound, while in solution, by means of a reducing agent and adding to the resulting solution of $gold^{I}$ compound the usual ingredients present in electrolytes for the electrodeposition of gold and its alloys.

The reducing agent is preferably $SO_2$ or a sulphite, usually the same sulphite used for preparing the starting complex (I). However other reducing agents which do not promote the complete reduction of $gold^{III}$ to $gold^{O}$ can also be used. An excess of $SO_3^{-2}$ is preferable since it has the effect of stabilizing the solution during plating.

Some heat is preferably used to perform the reduction. Usually heating between about 30 and 80° C. for several minutes is sufficient; however these conditions are not at all critical.

Electrolytic baths prepared according to the above process do show an unexpected and very surprising property. They can be used for plating at pH below 7; actually they show no tending to decompose down to pH about 4.5. Below that limit, the baths became unstable and are very difficult to operate. Better plating results and deposits of high quality are generally obtained at pH below 7. Adjustment of pH can be carried out with usual mineral or organic acids and bases such as $H_2SO_4$, $H_3PO_4$, NaOH, KOH, LiOH, $NH_4OH$ for instance.

Plating yields obtained with such baths are practically 100%. This is also an extremely surprising and valuable property.

The above electrolytic baths can also be prepared without having to isolate compound (I). Actually, when the anion components of the original $gold^{III}$ salt, usually chloride, are not harmful to the final electrolytic solution, the various reagents for producing the complex in situ, plus the reducing agent and the other ingredients usually added to the plating bath can be mixed together in solution, in any order, and the formation of the complex and its subsequent reduction to $Au^{+1}$ will take place without isolation of the complex. With this method the gold may be added as a soluble, non-cyanide gold compound in which the gold is present in its auric form. The results obtained using a bath prepared by this method are essentially the same as those obtained using a bath prepared directly from the complex. The addition of the complex, however, is preferred in that it tends to provide a purer and more stable gold plating solution.

Although Russian Pat. No. 217,167 discloses the addition of ethylene diamine to a gold sulfite bath, that bath is alkaline and the gold is in the +1 valence state, and under such conditions the complex of the instant invention cannot form. Further, there is no teaching that the Russian bath can operate at the unexpectedly lower pH levels available with the bath of the instant invention.

The baths prepared with the compound of the invention can have widely variable compositions depending on the end use. For instance their concentration in gold metal can vary from about 1 g./l. to 300 g./l., preferably from about 2 g./l. to 30 g./l. The pH can vary practically from about 4.5 to a pH of about 8.5 preferably from about 5.5 to 8.0, most preferably from about 6.0 to 7.0. The baths may contain various additives for many purposes, e.g. conducting or buffering salts such as alkali metal citrates, gluconates, tartrates, phosphates, sulphates and carbonates. They can also contain amines or amine salts, said amine being usual mono-primary, secondary or tertiary amines, e.g. butylamine, diethylamine and trimethylolamine, commonly found in galvanic baths or the same amines described above with reference to compound (I). The purpose of such amines is usually to buffer the solution and improve the physical properties of the deposits.

The baths can also contain brightening agents e.g. soluble salts, complexes or chelates of metals such as for instance Cd, Zn, Fe, Cu, Sn, Ni, Co, In, Pb, W, Ti, Mo, Mn and V. The quantity of these metals can be for instance 5 to 500 mg./l. The complexing agent can be for instance ethylene diamine tetraacetic acid and similar usual complexing agents. The baths can also contain other brightening agents e.g. 1 to 500 mg./l. of Bi, Se, Te or As in the same forms as described above.

In the cases of the plating of gold alloys, the bath will contain alloying metals in the form of soluble salts complexes or chelates as described above. The quantities of such, e.g. Zn, Cd, Pb, Fe, Ni, Sb, Co, Sn, In, Pd, Cu or Mn, can be comprised between 0.2 to 6 g./l. However, these limits are not critical and can be overstepped in special plating cases.

EXAMPLE 6

The following ingredients were dissolved in water:

| | |
|---|---|
| Au (as Na[en $Au(SO_3)_2$]) | 8 |
| $Na_2SO_3$ | 25 |
| $Na_2EDTA \cdot 2H_2O$ | 20 |
| Ni (as its complex with EDTA) | 16 |
| En sulphate | 40 |

Heating to 60° C. was carried out for a few minutes to promote the reduction. Then the pH was adjusted to 7–7.5 and the plating was carried out at 60° C. and 0.3 to 0.5 a./dm.$^2$. Hard and very shiny, high carat Au-Ni deposits were obtained.

EXAMPLE 7

A solution for the plating of pure gold is prepared, following the method of Example 1, with the following ingredients (g./l.).

| | |
|---|---|
| Au (as en[en $Au(SO_3)_2]_2$) | 2 |
| $Na_2SO_3$ | 50 |
| $Na_2EDTA \cdot 2H_2O$ | 20 |

After heating a short time at 40° C., the pH was adjusted between 9 and 10 and the plating was carried out at 30–40° C. and 2–3 a./dm.$^2$. Homogeneous strong and pure Au deposits were obtained which are useful as protecting layers for a base metal.

EXAMPLE 8

A solution for the plating of pure gold was prepared, with the following ingredients (g./l.).

| | |
|---|---|
| Au (as $H_4N$[en $Au(SO_3)_2$]) | 10 |
| $Na_2SO_3$ | 100 |
| En | 10 |
| $Na_2EDTA \cdot 2H_2O$ | 20 |
| Trinitrophenol | 0.3 |

After heating to initiate reduction of the complex, the pH was adjusted to 6.5–7 with $H_2SO_4$. The bath was operated at 60° C. and 0.5 a./dm.$^2$. Very hard, bright and thick pure Au deposits were obtained. The quality of these coatings was unusual and remarkable.

EXAMPLE 9

Without isolating the complex but preparing it in situ, the following bath for the electroplating of shiny gold was prepared by dissolving in water and mixing the following ingredients (g./l.).

| | |
|---|---|
| Au (as $H[AuCl_4] \cdot nH_2O$) | 10 |
| En | 13 |
| $Na_2SO_3$ | 30 |
| $Na_2EDTA \cdot 2H_2O$ | 20 |
| Sodium gluconate | 100 |
| Sb (as $SbCl_3$) | 3 |

After allowing the reaction to go to completion (slight heating to 60° C.), the pH was adjusted to 6 with $H_2SO_4$. Then the bath was operated at 50–60° C. and 0.5–1 a./dm.$^2$. Bright gold deposits were obtained the color of which was light pink.

The en used in the above examples, complexed with the gold as well as a separate ingredient can be replaced, if desired, by other amines, e.g. amino-ethyl ethanolamine, tetraethylene pentamine, isopropylene diamine, hexamethylenetetramine, $NH_4OH$, $H_2N(CH_2)_3{-}NH_2$, $$H_2N(CH_2)_2{-}NH(CH_2)_2{-}NH_2,$$

$$CH_3{-}CH(NH_2){-}CH_2{-}NH_2,\ N(CH_2{-}CH_2)_3N,$$

$$(CH_3)_2N{-}CH_2{-}CH_2{-}N(CH_3)_2,$$

and $HN(CH_2{-}CH_2)_2NH$.

We claim:

1. A gold complex of the formula $$Me[A\ Au(SO_3)_2]_pX_q$$

wherein Me is a mono- or polyvalent cation, A is ammonia or a polyamine having the formula

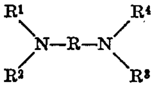

wherein $R^1$, $R^2$, $R^3$ and $R^4$ are individually H or $C_1$ to $C_4$ linear or branched monovalent radicals substituted or not with —OH, —CO or —COOH; or $R^1$ and $R^4$ taken together, or $R^2$ and $R^3$ taken together are divalent $C_2$ to $C_6$ alkylene or alkenylene radicals substituted or not with —OH, —CO or —COOH; R is a $C_2$ to $C_6$ alkylene or alkenylene radical substituted or not with —OH, —CO, —COOH, or is part of an aromatic ring, or is a radical of the formula $$-(CH_2{-}CH_2{-}NR^5)_mCH_2CH_2-$$

wherein $m$ is the integer 1, 2 or 3, and $R^5$ is H or a $C_1$ to $C_4$ linear or branched monovalent radical substituted or not with —OH, —CO or —COOH, X is an anion; $p$ is 1, 2, or 3; and $q$ is 0, 1, or 2, the sum of $p+q$ being equal to the valence of Me.

2. The complex of claim 1 wherein X is a halide or sulfate.

3. The complex of claim 2 wherein $R^1$, $R^2$, $R^3$ and $R^4$ are individually H or $C_1$ to $C_4$ linear or branched monovalent radicals or $R^1$ and $R^4$ taken together or $R^2$ and $R^3$ taken together are divalent $C_2$ to $C_6$ alkylene radicals and R is a $C_2$ to $C_6$ alkylene or alkenylene radical or $-(CH_2{-}CH_2{-}HR^5)_mCH_2{-}CH_2-$ wherein $R^5$ is H or a $C_1$ to $C_4$ linear or branched monovalent radical.

4. The complex of claim 3 wherein $q=0$.

5. The complex of claim 4 wherein Me is a monovalent or polyvalent cation selected from the group consisting of $NH_4^+$, $Na^+$, $K^+$, and a radical of said polyamine.

6. The complex of claim 5 wherein $R^1$, $R^2$, $R^3$, and $R^4$ are H.

7. The complex of claim 6 wherein R is a $C_2$ to $C_6$ alkylene radical.

8. The complex of claim 7 wherein A is selected from the group consisting of ethylene diamine, diethylene triamine, and isopropylene diamine.

9. The complex of claim 8 wherein A is ethylene diamine.

References Cited

UNITED STATES PATENTS 3,458,542 7/1969 Moore et al. ---- 260—430 X R
3,057,789 10/1962 Smith ---------- 204—46

FOREIGN PATENTS 1,134,615 11/1968 Great Britain.

OTHER REFERENCES

Chemical Abstracts, vol. 71, 97928k (1969).
Chemical Abstracts, vol. 48, 3182g (1954).
Chemical Abstracts, vol. 64, 167h (1966).
Chemical Abstracts, vol. 58, 13119g (1963).

DANIEL E. WYMAN, Primary Examiner
P. F. SHAVER, Assistant Examiner

U.S. Cl. X.R.

204—46; 260—429 R, 429.9, 438.5 R, 439 R; 423—517, 518

UNITED STATES PATENT OFFICE
CERTIFICATE OF CORRECTION

Patent No. 3,787,463 Dated January 22, 1974

Inventor(s) Franco Zuntini, Giuseppe Aliprandini, Jean-Michel Gioria, Andre Meyer, and Salvatore Losi It is certified that error appears in the above-identified patent and that said Letters Patent are hereby corrected as shown below:

Claim 1, lines 3 and 4, after "A is", delete --ammonia or--.

Signed and sealed this 31st day of December 1974.

(SEAL)
Attest:

McCOY M. GIBSON JR.
Attesting Officer

C. MARSHALL DANN
Commissioner of Patents